(12) United States Patent
Nakajima et al.

(10) Patent No.: US 11,054,575 B2
(45) Date of Patent: Jul. 6, 2021

(54) OPTICAL SPECTRUM SHAPER AND OPTICAL SIGNAL MONITOR USING SAME

(71) Applicant: Nippon Telegraph and Telephone Corporation, Tokyo (JP)

(72) Inventors: Mitsumasa Nakajima, Musashino (JP); Kazunori Senoo, Musashino (JP); Kenya Suzuki, Musashino (JP); Toshikazu Hashimoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/968,450

(22) PCT Filed: Mar. 4, 2019

(86) PCT No.: PCT/JP2019/008312
§ 371 (c)(1),
(2) Date: Aug. 7, 2020

(87) PCT Pub. No.: WO2019/172162
PCT Pub. Date: Sep. 12, 2019

(65) Prior Publication Data
US 2020/0400885 A1    Dec. 24, 2020

(30) Foreign Application Priority Data
Mar. 7, 2018 (JP) .............................. JP2018-041137

(51) Int. Cl.
*G02B 6/12* (2006.01)
*G02B 6/28* (2006.01)
(Continued)

(52) U.S. Cl.
CPC ....... *G02B 6/12014* (2013.01); *G02B 6/2821* (2013.01); *G02B 6/293* (2013.01); *G02B 6/34* (2013.01); *G02F 1/073* (2013.01)

(58) Field of Classification Search
CPC .. G02B 6/12014; G02B 6/2821; G02B 6/293; G02B 6/34; G02B 6/29395;
(Continued)

(56) References Cited

U.S. PATENT DOCUMENTS

| 7,346,234 B2 * | 3/2008 | Davis | G02B 6/29311 |
| | | | 385/15 |
| 8,346,086 B2 * | 1/2013 | Suzuki | G02F 1/0121 |
| | | | 398/79 |

(Continued)

FOREIGN PATENT DOCUMENTS

| JP | H09-258117 A | 10/1997 |
| JP | 2017-58417 A | 3/2017 |

OTHER PUBLICATIONS

X. Li et al., *OSNR Monitoring Method for OOK and DPSK Based on Optical Delay Interferometer*, IEEE Photonics Technology Letters, vol. 19, No. 15, Aug. 1, 2007, pp. 1172-1174.
(Continued)

*Primary Examiner* — John Bedtelyon
(74) *Attorney, Agent, or Firm* — Workman Nydegger

(57) ABSTRACT

The present invention implements an optical spectral shaper that is compact even if a number of input/output ports increases. The present invention provides a spatial light modulator, including: an optical waveguide front end that includes an input side waveguide portion which emits each signal light at a different angle while expanding a beam diameter of the signal light, and an output side waveguide portion that wave-guides each of the inputted signal lights, and couples the signal lights with a plurality of output fibers respectively; a spatial light modulator that changes the phase
(Continued)

of each signal light by controlling the phase pattern of the plurality of pixels and emits the signal light, and the spatial light modulator in which a specific phase pattern is set for each pixel region to which each signal light enters; and an optical element group that is disposed so that each of the signal lights emitted from the optical waveguide front end is collected at a different pixel position on the spatial light modulator, and the light emitted from the spatial light modulator is coupled with the optical waveguide front end.

13 Claims, 13 Drawing Sheets

(51) Int. Cl.
*G02B 6/293* (2006.01)
*G02B 6/34* (2006.01)
*G02F 1/07* (2006.01)

(58) Field of Classification Search
CPC ........... G02B 6/29311; G02B 6/12019; G02F 1/073; G02F 1/01
See application file for complete search history.

(56) References Cited

U.S. PATENT DOCUMENTS 9,467,755 B2 * 10/2016 Suzuki ............... H04Q 11/0005
9,588,300 B2 * 3/2017 Nakajima ............ G02B 6/3548
10,797,817 B2 * 10/2020 Seno .................... H04B 10/548

OTHER PUBLICATIONS

Mitsumasa Nakajima et al., *In-Band OSNR Monitors comprising Programmable Delay Line Interferometer Integrated with Wavelength Selective Switch by Spatial and Planar Optical Circuit*, OFC2016, Mar. 20, 2016, pp. 3.
Yasuki Sakurai et al., *LCOS-Band Wavelength Blocker Array with Channel-by-Channel Variable Center Wavelength and Bandwidth*, IEEE Photonics Technology Letters, vol. 23, No. 14, Jul. 15, 2011, pp. 989-991.
Yuichiro Ikuma et al., *Low-Loss Transponder Aggregator Using Spatial and Planar Optical Circuit*, Journal of Lightwave Technology, vol. 34, No. 1, Jan. 1, 2016, pp. 67-73.
Kazunori Seno et al., *Spatial Beam Transformer for Wavelength Selective Switch Consisting of Silica-Based Planar Lightwave Circuit*, OFC/NFOEC Technical Digest, JTh2A.5, Mar. 4, 2012, pp. 4.
International Search Report and Written Opinion dated May 7, 2019, issued in PCT Application No. PCT/JP2019/008312, filed Mar. 4, 2019.

* cited by examiner

OPTICAL SPECTRUM SHAPER AND OPTICAL SIGNAL MONITOR USING SAME

TECHNICAL FIELD

The present invention relates to an optical spectral shaper and an optical signal monitoring apparatus equipped therewith.

BACKGROUND ART

Along with the increase in Internet traffic, the need to increase the communication capacity of optical fiber communication is increasing all the more. In order to flexibly operate and maintain networks without diminishing the reliability of the optical network, monitoring optical signals is essential. Particularly, for an optical monitor to detect a disconnection of an optical path and to detect abnormalities, an optical channel monitor (OCM), which measures the light intensity of each wavelength channel, is now widely used. An OCM is installed at each network node.

Further, demand for an optical signal noise ratio (OSNR) monitor, with which information directly connected to a bit error rate (BER) of an optical signal is acquired, is also increasing as the signal formats become increasing more complicated.

Various types of configurations are used for OCM, but a configuration using a variable wavelength filter and a photodetector (PD) is often used, because this configuration is simple and can implement highly precise measurement. If this configuration is used, the light intensity of each wavelength channel can be measured by sweeping the central frequency of the variable wavelength filter in a time domain. Another configuration of OCM commonly used is a configuration of using a wavelength dispersion element (e.g. diffraction grating), and an image sensor. In the case of this configuration, the wavelength channel is entered to a different position on an image sensor using the wavelength dispersion element, and the relationship between the position and the wavelength is detected in advance, whereby the intensity information of the wavelength channel can be acquired all at once.

For the OSNR monitor, a method of linearly interpolating the spontaneous emission light outside the signal band (ASE) level in the optical spectrum measured using a similar method as OCM, and estimating the noise to power ratio caused by the ASE with respect to the light intensity (ASE interpolation method), has been commonly used. However, with this conventionally used ASE interpolation method, it is becoming difficult to estimate the ASE level because the bands of the optical signals are becoming wider due to higher symbol rates, and the spectral characteristic of ASE light is not uniform because the ASE light passes through many stages of the optical filters. As a consequence, an in-band type OSNR monitoring method, which can directly estimate the noise power in the signal band, is demanded.

Various configurations have been proposed for the in-band type OSNR monitor as well, but a configuration using a wavelength filter, delay interference system and PD are useful, since the configuration is simple and OSNR can be measured regardless the signal format. This configuration is for estimating OSNR based on the difference in the coherence between the signal light of the delay interference system and the ASE light, and allows estimating OSNR only from the received light intensity of the PD by performing calibration at the initial stage (e.g. see NPL 1).

Generally the optical signal monitoring apparatus does not require OSNR information all the time, so in many cases, the optical signal monitoring apparatus measures only the light intensity during normal operation and measures OSNR when a failure is analyzed or line design is performed. Therefore in a single optical signal monitoring apparatus, if an optical spectral shaper can be configured such that the optical monitoring functions of the OCM, OSNR monitor and the like can be dynamically changed by controlling the phase, intensity and amplitude of the light having an arbitrary wavelength, then it is unnecessary to install OCM and an OSNR monitor separately, that is, the number of devices can be reduced, and optical signal monitoring can be performed more efficiently.

CITATION LIST

Patent Literature

[PTL 1] JP-A-2017-58417

Non Patent Literature

[NPL 1] X. Liu, et al., "OSNR Monitoring Method for OOK and DPSK based on Optical Delay Interferometer", *IEEE Photonics Technology Letters*, Vol. 19, No. 15, pp. 1172-1174 (2007)

[NPL 2] M. Nakajima, et al., "In-band OSNR Monitors Comprising Programmable Delay Line Interferometer Integrated with Wavelength Selective Switch by Spatial and Planar Optical Circuit", OFC (2016)

[NPL 3] Y. Sakurai, M. Kawasugi, Y. Hotta, M. D. S. Khan, H. Oguri, K. Takeuchi, S. Michihata, N. Uehara, "LCOS-based Wavelength Blocker Array with Channel-by-Channel Variable Center Wavelength and Bandwidth", *IEEE Photonics Technol. Lett.*, Vol. 23, No. 14, pp. 989-991

SUMMARY OF THE INVENTION

Technical Problem

FIG. 1 is a schematic diagram illustrating a conventional optical spectral shaper using a spatial light modulator (SLM) disclosed in PTL 1, which is used for an optical signal monitoring apparatus. The optical spectral shaper illustrated in FIG. 1(a) and FIG. 1(b) includes: a plurality of input fibers $111_1$ to $111_N$ which are input ports; a plurality of output ports $112_1$ to $112_N$ which are output ports; a plurality of input collimate lenses $121_1$ to $121_N$ which are disposed corresponding to the input fibers $111_1$ to $111_N$; an optical element group 130; an SLM 140; and a plurality of output collimate lenses $122_1$ to $122_N$ which are disposed corresponding to the output fibers $112_1$ to $112_N$.

FIG. 1(a) is a diagram viewed from the x axis direction, and FIG. 1(b) is a diagram viewed from the y axis direction. In FIG. 1(a) and FIG. 1(b), the direction in which the input fibers 111 and the output fibers 112 are arrayed is the y axis, the direction in which the signal light propagates through the input fibers 111 is the z axis, and the direction that is vertical to the y axis and z axis is the x axis.

As illustrated in FIG. 1, the optical element group 130 includes: a diffraction grating 131 that performs wavelength dispersion of the signal light which is inputted from each input fiber 111 via the input collimate lens 121; and a lens 132 that collects the light to a different position on the SLM 140 depending on the input port and wavelength, and couples each signal with the output fiber 112 corresponding to the input fiber 111.

In the optical signal monitoring apparatus illustrated in FIG. 1, the N number of lines of inputted signal lights are emitted to a space via the input fibers $111_1$ to $111_N$, and enter the optical element group 130 via the input collimate lenses $121_1$ to $121_N$. The optical element group 130 collects the lights at different positions on the SLM 140 for each wavelength channel and input port. The collected signal light is emitted after the phase thereof is changed by the SLM 140, and is returned to the optical fibers $112_1$ to $112_N$ via the optical element 130 and the output collimate lenses $122_1$ to $122_N$.

The SLM 140 is an element where pixels are arrayed in a matrix on the xy plane, and can control the phase of light independently in each pixel. The inputted signal lights are collected at different positions on the SLM 140 depending on the wavelength channel and input port. Since the wave front of the emitted light can be controlled by providing a specific phase pattern for each pixel region, a signal light can be shaped to an arbitrary spectral shape.

In the case of the conventional optical signal monitoring apparatus, a light-receiving unit is combined with each optical fiber in the optical spectral shaper disclosed in PTL 1, and the spectral shape of the signal light is controlled for each wavelength channel using the SLM 140, whereby a characteristic evaluation can be performed while dynamically changing the optical monitoring functions of OCM, OSNR and the like.

Additionally, and easily deduced from the configuration disclosed in PTL 1, the intensity of each fiber can be measured for each wavelength, that is, the function of OCM can be implemented by replacing the SLM 140 with an image sensor. This configuration includes the OSNR monitoring function, but has useful advantages for OCM in terms of size and cost, since the SLM, output fibers and PD array are not required.

Currently the paths of networks are further increasing, and a number of optical monitors that are needed is also increasing. Additionally, consideration of space division multiplexing (SDM) using multi-core fibers and the like is progressing, and it is now necessary to monitor optical signals which are multiplexed not only in the wavelength direction but also in the spatial direction.

However in the case of the conventional optical spectral shaper, the input collimate lenses $121_1$ to $121_N$ and the output collimate lenses $122_1$ to $122_N$ must be arrayed in the y axis direction, as illustrated in FIG. 1, that is, a problem here is that the size of the optical signal monitoring apparatus increases due to the size of lenses as the number of optical monitors increases. Furthermore, a size and a number of pixels of the SLM and image sensor are normally limited, which means that the spatial multiplex number that can be implemented is limited. For example, in the case of the fiber array type spectral shaper according to NPL 3, the spatial multiplex number is 12. Therefore, a technique to allow mounting a large scale compact optical monitor is demanded.

With the foregoing in view, it is an object of the present invention to provide an optical spectral shaper and an optical signal monitoring apparatus that can be configured compact, even if a number of input/output ports is increased.

Means for Solving the Problem

An optical spectral shaper according to an aspect of the present invention includes: a plurality of input fibers that input signal lights; a plurality of output fibers that output the signal lights; and an optical waveguide front end that includes an input side waveguide portion which emits each signal light at a different angle while expanding a beam diameter of the signal light emitted from each of the plurality of input fibers respectively, and an output side waveguide portion that wave-guides each of the inputted signal lights and couples the signal lights with the plurality of output fibers respectively. The optical spectral shaper further includes: a spatial light modulator that includes a plurality of pixels which are arrayed on a plane in a matrix and a drive unit that drives the plurality of pixels, and that changes the phase of each inputted signal light by the drive unit controlling the phase patterns of the plurality of pixels, and emits the signal light. In the spatial light modulator, a specific phase pattern is set for each pixel region to which each signal light enters. The optical spectral shaper further includes: an optical element group that is disposed so that each of the signal lights emitted from the input side waveguide portion of the optical waveguide front end is collected at a different pixel position on the spatial light modulator, and the optical element group is disposed so as to couple the light emitted from the spatial light modulator with the output side waveguide portion of the optical waveguide front end.

An optical signal monitoring apparatus according to an aspect of the present invention includes: the optical spectral shaper according to an aspect of the present invention; an optical coupler that branches optical signals of a plurality of main optical fibers and inputs the branched optical signals to the plurality of input fibers; a light receiving unit array that measures the intensity of a plurality of signal lights outputted from the optical spectral shaper; and a calculation unit that calculates a measurement value in accordance with the monitor content for each of the signal lights based on the intensity of each light measured by the light receiving unit array respectively.

An optical signal monitoring apparatus according to another aspect of the present invention includes: a plurality of input fibers that input signal lights; a plurality of output fibers that output signal lights; an optical waveguide front end that includes an input side waveguide portion which emits each signal light at a different angle while expanding a beam diameter of the signal light emitted from each of the plurality of input fibers respectively; an image sensor constituted of a plurality of pixels that are arrayed on a plane in a matrix; an optical element group that is disposed so that each of the signal lights emitted from the input side waveguide portion of the optical waveguide front end is collected at a different pixel position on the image sensor respectively; and a calculation unit that calculates an intensity of the signal light propagating through each of the plurality of input fibers, based on the intensity of the light measured by the image sensor respectively.

Effects of the Invention

According to an aspect of the present invention, an optical spectral shaper and an optical signal monitoring apparatus that can be configured compact, even if a number of input/output ports is increased, can be implemented.

DESCRIPTION OF EMBODIMENTS

Embodiment 1

Figure 1A:
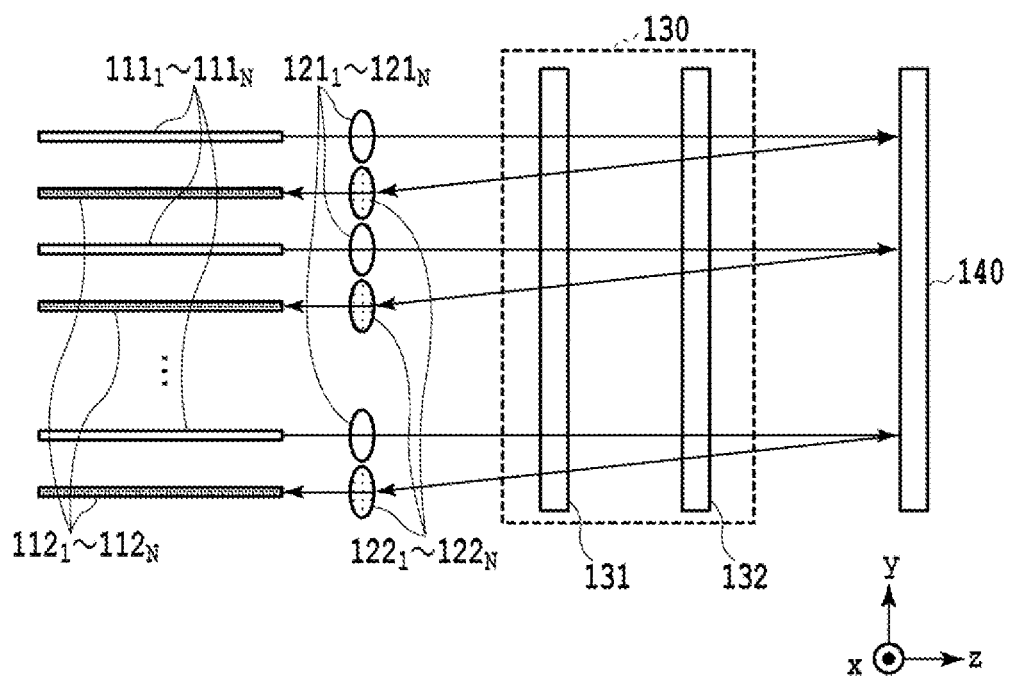
FIG. 1 is a schematic diagram illustrating a conventional optical spectral shaper according to PTL 1.
Figure 1B:
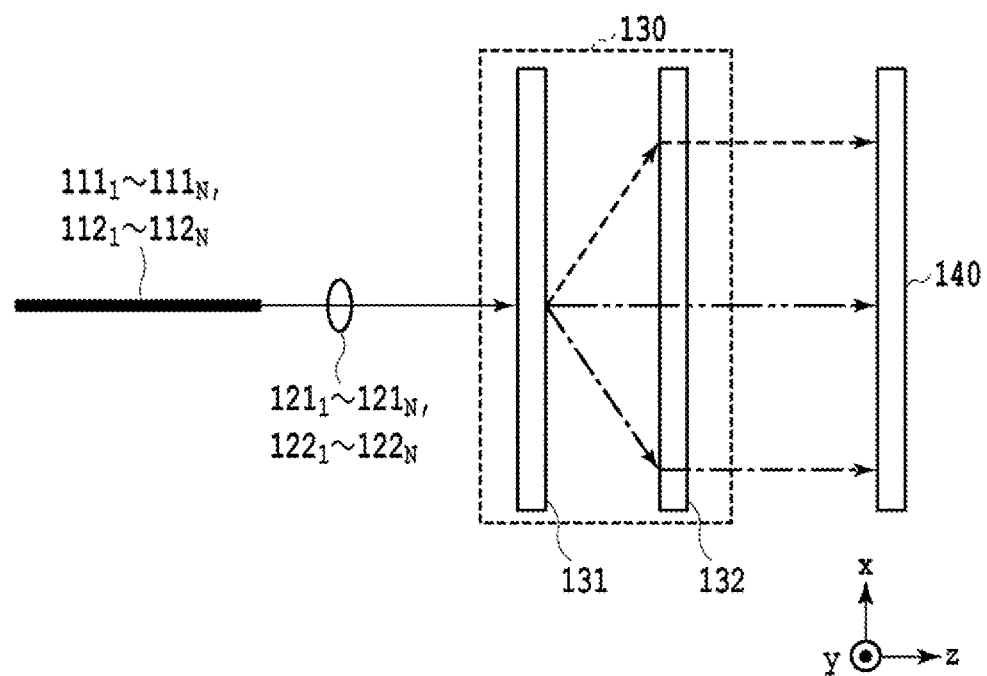
Figure 2A:
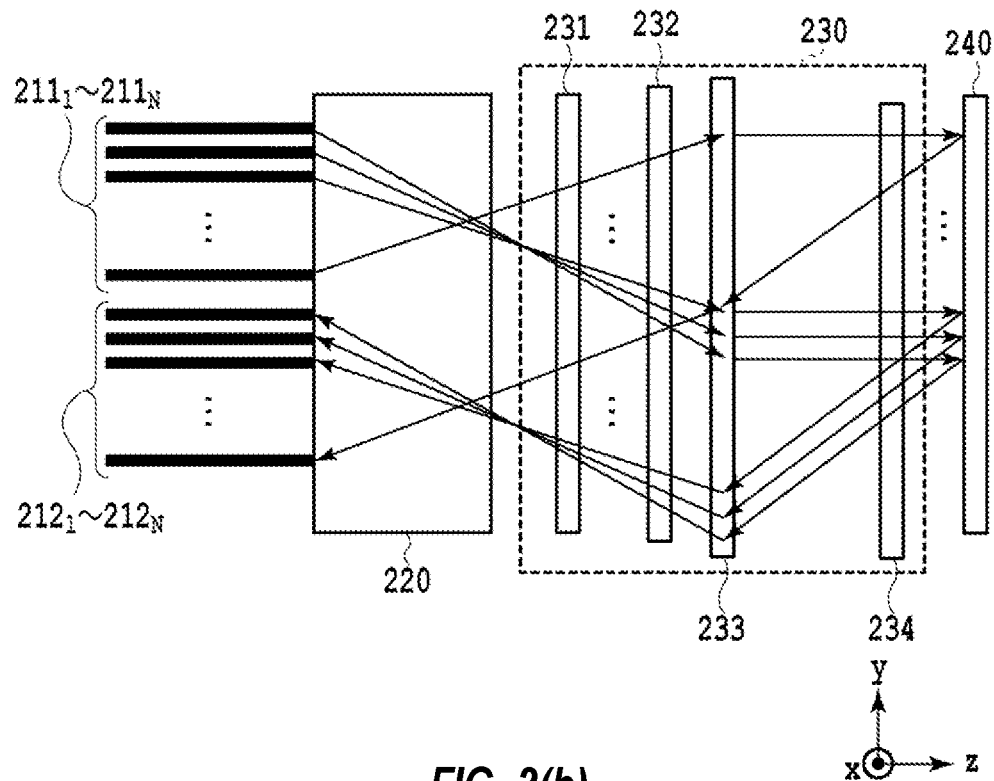
FIG. 2 is a schematic diagram illustrating an optical spectral shaper according to Embodiment 1 of the present invention.
Figure 2B:
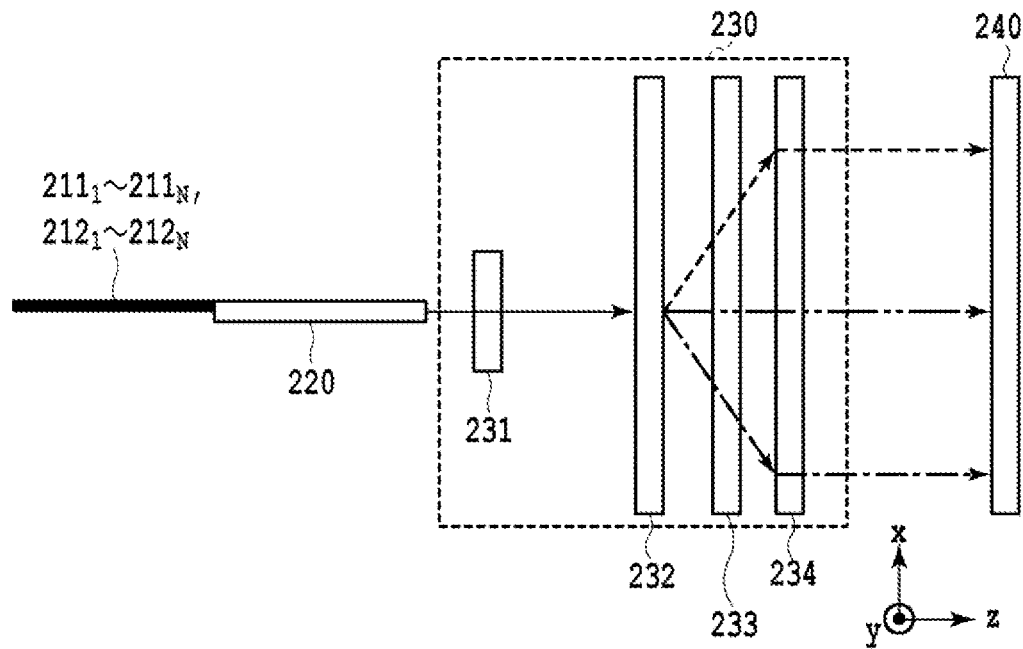

FIG. 2 is a schematic diagram illustrating a configuration of an optical spectral shaper according to Embodiment 1 of the present invention. The optical spectral shaper illustrated in FIG. 2(a) and FIG. 2(b) includes: a plurality of input fibers $211_1$ to $211_N$ which are input ports; a plurality of output fibers $212_1$ to $212_N$ which are output ports; an optical waveguide front end 220; an optical element group 230; and an SLM 240.

FIG. 2(a) is a diagram viewed from the x axis direction, and FIG. 2(b) is a diagram viewed from the y axis direction. In FIG. 2(a) and FIG. 2(b), the direction in which the input fibers 211 and the output fibers 212 are arrayed is the y axis, the direction in which the signal light propagates through the input fibers 211 is the z axis, and the direction that is vertical to the y axis and z axis is the x axis.

Figure 3:
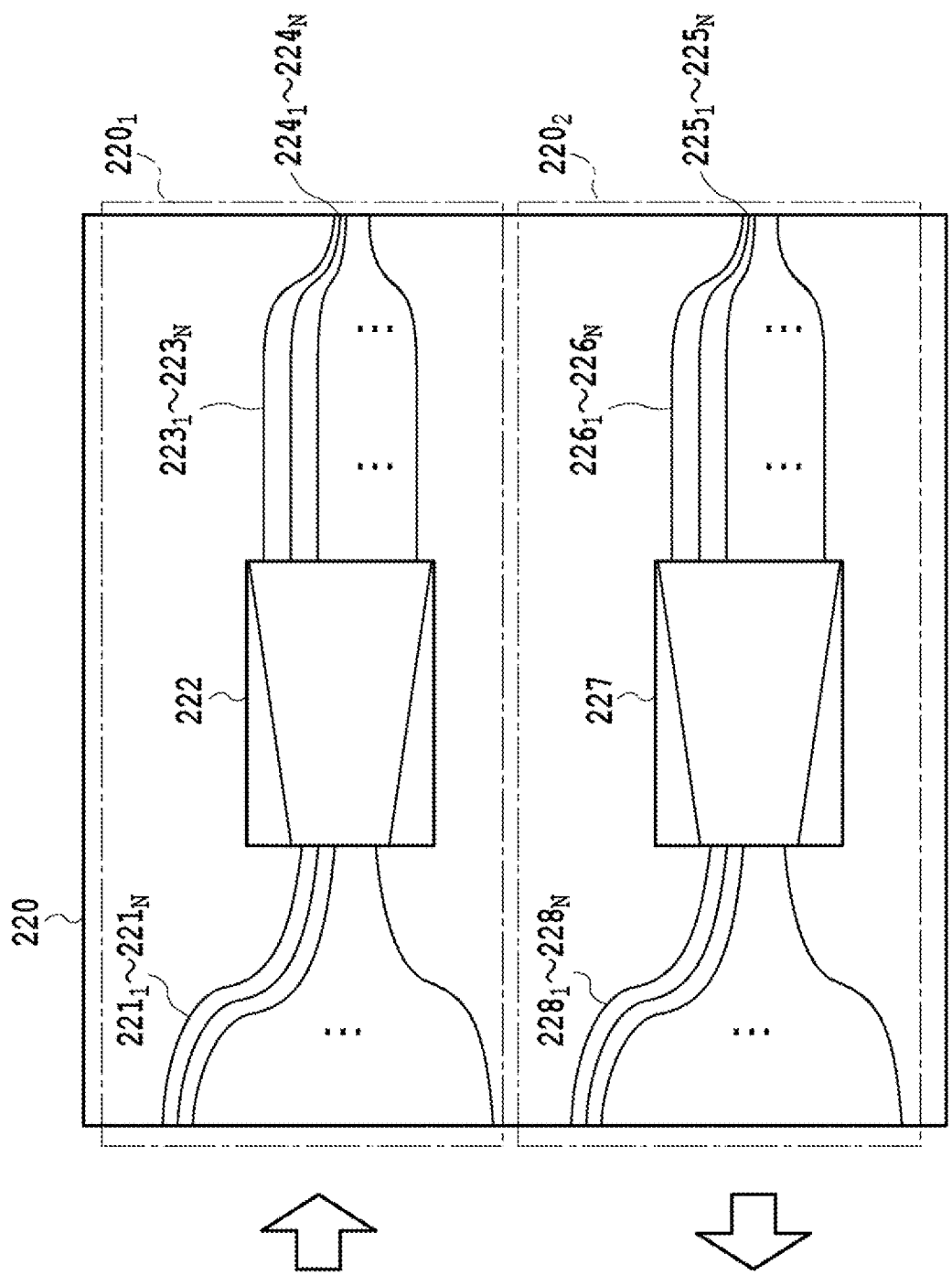
FIG. 3 is a diagram illustrating a configuration of an optical waveguide front end according to the present invention.

FIG. 3 is a diagram illustrating a configuration of the optical waveguide front end 220 according to the present invention. As illustrated in FIG. 3, the optical waveguide front end 220 includes an input side waveguide portion $220_1$, and an output side waveguide portion $220_2$.

The input side waveguide portion $220_1$ includes: first input waveguide portions $221_1$ to $221_N$ which wave-guide each signal light inputted from the input fibers $211_1$ to $211_N$; an input slab waveguide 222 that disperses and guides the signal light inputted from each of the first input waveguide portions $221_1$ to $221_N$ while expanding the optical beam diameter; second input waveguide portions $223_1$ to $223_N$ that the signal light dispersed by the input slab waveguide 222 enters respectively; and optical phased array emission portions $224_1$ to $224_N$ that convert the emission angles of the signal lights, emitted from the second input waveguide portions $223_1$ to $223_N$ respectively, in accordance with the wave front of the signal light, and that output the signal lights, of which emission angles were converted, to the optical element group 230.

The output side waveguide portion $220_2$ includes: optical phased array entrance portions $225_1$ to $225_N$ to which each signal light, outputted from the SLM 240 via the optical element group 230, enters; first output waveguide portions $226_1$ to $226_N$ that propagate the signal lights which entered the optical phased array entrance portions $225_1$ to $225_N$ respectively; an output slab waveguide 227 which wave-guides the signal light inputted from each of the first output waveguide portions $226_1$ to $226_N$ respectively; second output waveguides $228_1$ to $228_N$ which guide each signal light inputted from the output slab waveguide 227 and output each signal light to the output fibers $212_1$ to $212_N$.

The optical element group 230 includes a first collimate lens 231, a diffraction grating 232, a Fourier lens 233, and a second collimate lens 234. For each wavelength channel and input port, the optical element group 230 collects the signal lights, emitted from the optical phased array exit portions $224_1$ to $224_N$ of the optical waveguide front end 220, at different pixel positions on the SLM 240, and outputs the signal light emitted from the SLM 240 to different optical phased array entrance portions $225_1$ to $225_N$ of the optical waveguide front end 220 respectively.

The SLM 240 is an element where a plurality of pixels are arrayed in a matrix on the xy plane, and includes a drive unit (not illustrated) that drives a plurality of pixels. By the drive unit controlling the phase patterns of a plurality of pixels arrayed in a matrix, the light inputted to each pixel can be emitted by independently controlling the intensity, phase, delay time and the like of the light. For the SLM 240, liquid crystal-on-silicon (LCOS), a micro-electro mechanical system (MEMS) mirror or the like can be used.

The LCOS can control the orientation direction of the liquid crystal material in a pixel using the voltage that is applied to the driver electrode. Therefore, the phase of the signal light can be controlled by changing the refractive index of the liquid crystal correspondence to the signal light that is inputted, and the phase controlled signal light can be emitted. A reflection type phase modulator can be implemented by forming the front surface electrode of the LCOS as a transparent electrode and the rear surface electrode of the LCOS as a reflection electrode. In the LCOS, a material that exhibits an electro-optical effect may be used instead of the liquid crystal material. The MEMS mirror can change the optical length for each pixel by applying voltage and turning the mirror corresponding to the position of each pixel in the z axis direction, whereby the phase of the light can be controlled.

Figure 4:
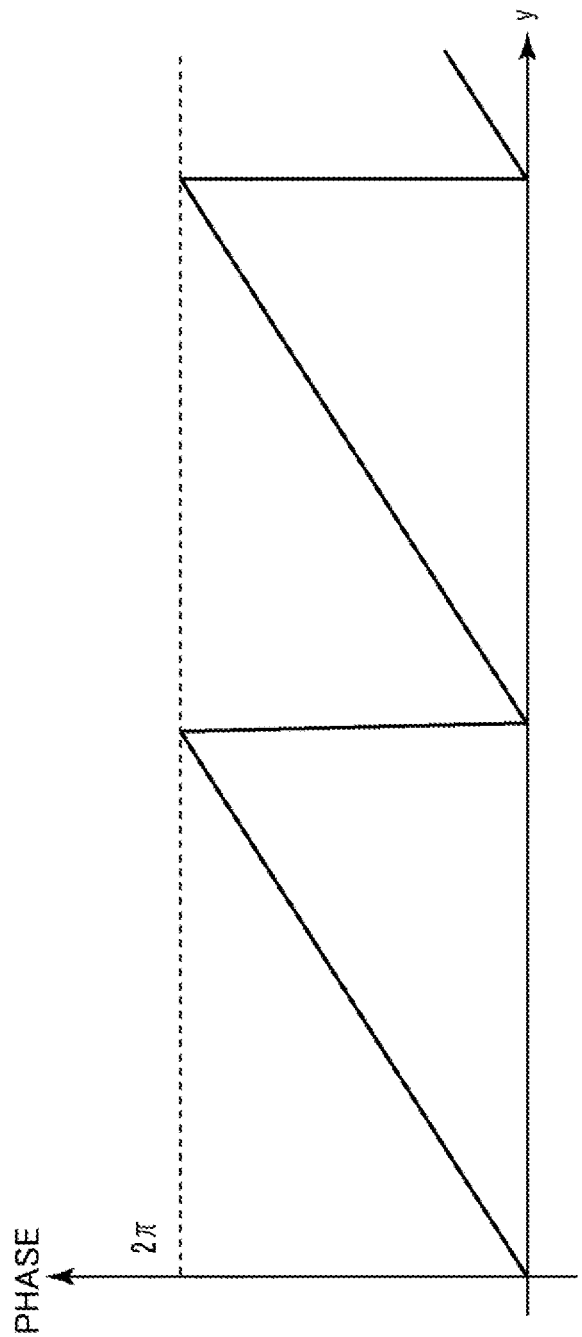
FIG. 4 is a graph indicating a phase pattern of voltage that is applied to an SLM according to the present invention.

FIG. 4 illustrates a phase pattern of voltage that is applied to the SLM according to the present invention. By applying the voltage having the phase pattern of a sawtooth wave, as illustrated in FIG. 4, to the SLM 240, for example, the signal light can be deflected. The SLM 240 can control the deflection angle of the entered signal light in accordance with the inclination of the phase pattern of the sawtooth wave. Therefore, in the case of the optical spectral shaper according to the present invention, an arbitrary spectral shape can be implemented for a signal light by setting a phase pattern that is different for each wavelength channel in the SLM 240.

In the optical signal monitoring apparatus illustrated in FIG. 2, each of the N number of signal lights that are inputted are coupled into each of the first input waveguide portions $221_1$ to $221_N$ in the optical waveguide front end 220 via the input fibers $211_1$ to $211_N$.

The signal lights propagating through the first input waveguide portions $221_1$ to $221_N$ are expanded and dispersed in the input side slab waveguide 222, and enter the second input waveguide portions $223_1$ to $223_N$. This means that in each waveguide of the second input waveguide portions $223_1$ to $223_N$, all the signal lights emitted from the first input waveguide portions $221_1$ to $221_N$ are shared. In the first input waveguide portions $221_1$ to $221_N$ and the second input waveguide portions $223_1$ to $223_N$, the length of each waveguide is adjusted so that a delay difference is not generated among the signal lights propagating through the respective waveguides, and each waveguide is separate from an adjacent waveguide by a distance at which the signal lights propagating through the adjacent waveguides do not interfere with each other. Thereby the N number of inputted signal lights reach the optical phased array exit portions $224_1$ to $224_N$ while maintaining the state of the optical wave front in the input side slab waveguide 222.

In the optical phased array exit portions $224_1$ to $224_N$, each exit end of each waveguide is disposed close to each other so that the signal light emitted from each waveguide interferes with each other. To cause interference of each signal light emitted from each waveguide, the emitting angle of the signal light emitted from each optical phased array exit portion $224_1$ to $224_N$ differs depending on the direction of the wave front of the signal light which is inputted to each optical phased array exit portion $224_1$ to $224_N$. In the second input waveguide portions $223_1$ to $223_N$, the wave front surface in the input side slab waveguide 222 is maintained, hence the direction of the wave front changes depending on the position of each second input waveguide portion $223_1$ to $223_N$. Therefore, many input optical signals can be emitted at different angles by inputting the signal lights to the input side slab waveguide 222 at high density. The beam diameter at this time has been expanded in the y direction in the input side slab waveguide 222 at a magnification ratio which is determined by the length of the input side slab waveguide 222. Each optical beam emitted from each optical phased array exit portion $224_1$ to $224_N$ enters the optical element group 230.

The signal light that is inputted to the optical element group 230 via the optical waveguide front end 220 enters the diffraction grating 232 via the collimate lens 231, is wavelength-dispersed by the diffraction grating 232, and enters the Fourier lens 233. Each light that is inputted to the Fourier lens 233 at a different angle is collected at a different position on the SLM 240 via the lens 234.

The light that entered the Fourier lens 233 is collected on the SLM 240 via the lens 234. In the Fourier lens 233, a beam diameter $w_1$ of the signal light that enters the SLM 240 decreases as the beam diameter $w_0$ of the signal light emitted from the optical waveguide front end 220 is larger. In other words, by controlling the beam diameter and the emission angle of each signal light that is emitted from each optical phased array exit portion $224_1$ to $224_N$ of the optical waveguide front end 220, many signal lights can be irradiated onto the SLM 240 at high density.

When each signal light is collected at a different pixel position on the SLM 240 for each wavelength channel, the phase of the signal light is changed by the SLM 240 and the signal light is emitted from the SLM 240. The signal light emitted from the SLM 240 reaches the optical waveguide front end 220 again via the optical element 230. In the SLM 240, the wave front of the emission light can be controlled for each pixel region, to which signal light enters, by setting an applied voltage so that a specific phase pattern is generated.

The signal light that entered each optical phase array entrance portion $225_1$ to $225_N$ of the optical waveguide front end 220 is outputted to each output filter $212_1$ to $212_N$ via each first output waveguide portion $226_1$ to $226_N$, the output slab waveguide 227, and each second output waveguide portion $228_1$ to $228_N$ respectively.

The spatial multiplex number that can be implemented by this configuration will be described. In the case where the height of the SLM 240 in the y direction is H, and the beam interval from the beam of the adjacent port on the SLM 240 is $\Delta d_{SLM}$, the maximum spatial multiplex number N that can be implemented by the present invention can be given by the following (Expression 1).

Formula 1

$$N = H/\Delta d_{SLM} \quad \text{(Expression 1)}$$

In the case where the beam diameter $\omega_{SLM}$ on the SLM 240 is not smaller than $\Delta d_{SLM}$, the beams overlap and crosstalk (XT) is generated on the optical monitor. To prevent this, $\Delta d_{SLM}$ must be set as in the following (Expression 2), setting k as a real number greater than 1.

Formula 2

$$\Delta d_{SLM} = k \omega_{SLM} \quad \text{(Expression 2)}$$

Based on the above relationship, the spatial multiplex number N is determined by the following (Expression 3) using the values of $\omega_{SLM}$ and H.

Formula 3

$$N = H/k\omega_{SLM} \quad \text{(Expression 3)}$$

This means that the spatial multiplex number N increases as k or $\omega_{SLM}$ is decreased. However, as mentioned above, the value of k is limited, and is preferably 3 or greater considering the case where coupling of the Gaussian beam is sufficiently small. If the value of k is smaller than this value, XT deteriorates, and the precision of the monitor is affected.

Further, decreasing the beam diameter $\omega_{SLM}$ decreases a number of pixels per beam, which leads to deterioration of the precision of the spectral shaper. For example, in order to implement the later mentioned delay interferometer function and band pass filter function with an accuracy that is sufficient for an optical monitor, it is preferable that $\omega_{SLM}$ is at least 5 pixels.

By selecting the minimum values of $\omega_{SLM}$ and k within the range of satisfying the above constraints, the spatial multiplex number N can be increased. However, in the case of the configuration of the fiber array type front end disclosed in PTL 1, it is difficult to freely design $\omega_{SLM}$ and k due to the constraints in the lens arrangement intervals and beam diameter of the fiber, as mentioned above. On the other hand, in the case of using the waveguide front end of the present invention, $\omega_{SLM}$ and k can be freely implemented. The design method thereof will be described.

Figure 5:
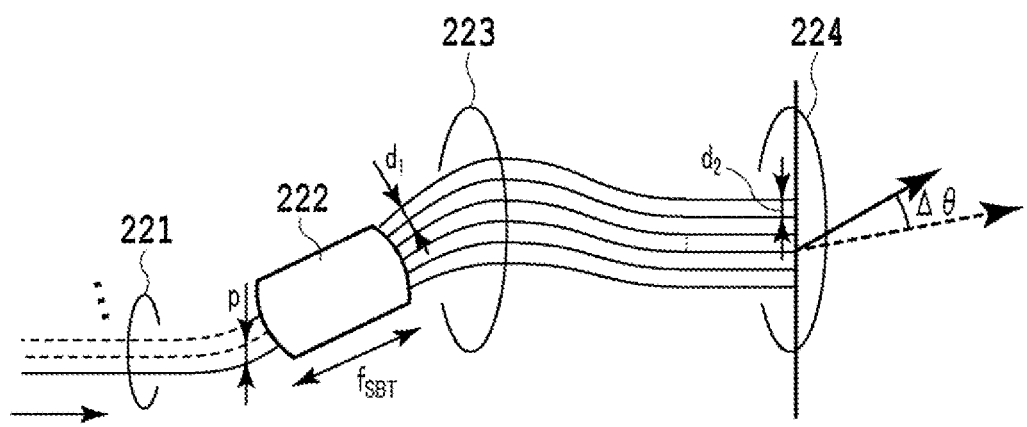
FIG. 5 is a diagram illustrating a concrete configuration of an optical waveguide front end 220.

FIG. 5 is a diagram illustrating a concrete configuration of the optical waveguide front end 220. In FIG. 5, p indicates a position offset of a location to couple the input waveguide $221_i$ (i is a port number) of the first input waveguide portion 221 to the input slab waveguide 222, $f_{SBT}$ indicates the length of the input slab waveguide 222, $d_1$ indicates an interval of the second input waveguide portions $223_1$ to $223_N$ at a location of the light emitting from the input slab waveguide 222, and $d_2$ indicates an interval of the waveguides at the optical phased array exit portion 224. In this case, the emitting angle $\theta_{SBT}$ of the optical beam emitted from the optical waveguide front end 220 to a space and the beam diameter $\omega_{SBT}$ thereof are given by the following (Expression 4) and (Expression 5) respectively.

Formula 4

$$\Delta\theta_{SBT}=(d_1/d_2)(p/f_{SBT}) \quad \text{(Expression 4)}$$

Formula 5

$$\omega_{SBT}=(\lambda f_{SBT}/\pi n\omega_0)(d_2/d_1) \quad \text{(Expression 5)}$$

Here $\lambda$ is a wavelength of the propagating beam, n is an effective refractive index of the waveguide, and $\omega_0$ is a mode diameter of the waveguide. In the case where this beam focuses on the SLM via a standard Fourier optical system, as illustrated in FIG. 2, the interval $\Delta d_{SLM}$ of the beam focusing positions is given by the following (Expression 7) based on (Expression 6).

Formula 6

$$\omega_{SLM}=(\lambda f_0/\pi\omega_{SBT}) \quad \text{(Expression 6)}$$

Formula 7

$$\Delta d_{SLM}=f_0 \sin(\theta_{SBT}) \sim (d_1/d_2)(p/f_{SBT}) \quad \text{(Expression 7)}$$

Here $f_0$ indicates a focal distance of the lens. By using (Expression 2) and (Expression 4) to (Expression 7), arbitrary k and $\omega_{SLM}$ can be implemented. For example, if $d_1=d_2=10$ µm, $\omega_0=5$ µm, $n=1.4$, $f_{sbt}=21$ mm and $f_0=150$ mm, $\omega_{SLM}=50$ µm and $k=3.5$ are obtained. In the case where the long axis, of which pixel pitch is 10 µm and a number of pixels is 4K, is disposed in the y direction (4096 pixels in the y direction), the spatial multiplex number N is 231. This is about 19.3 times compared with 12, which is a report value of the conventional fiber type spectral shaper described in NPL 3.

(Expression 4) to (Expression 7) consider the case of disposing the SLM 240 on the focal plane which is the position where the beam diameter is the minimum (that is, 2-$f$ system), but it is not always necessary to dispose the SLM 240 on the focal plane. For example, if the SLM 240 is disposed closer to the lens side, the optical length can be decreased. The present invention includes such a configuration as well.

Figure 6:
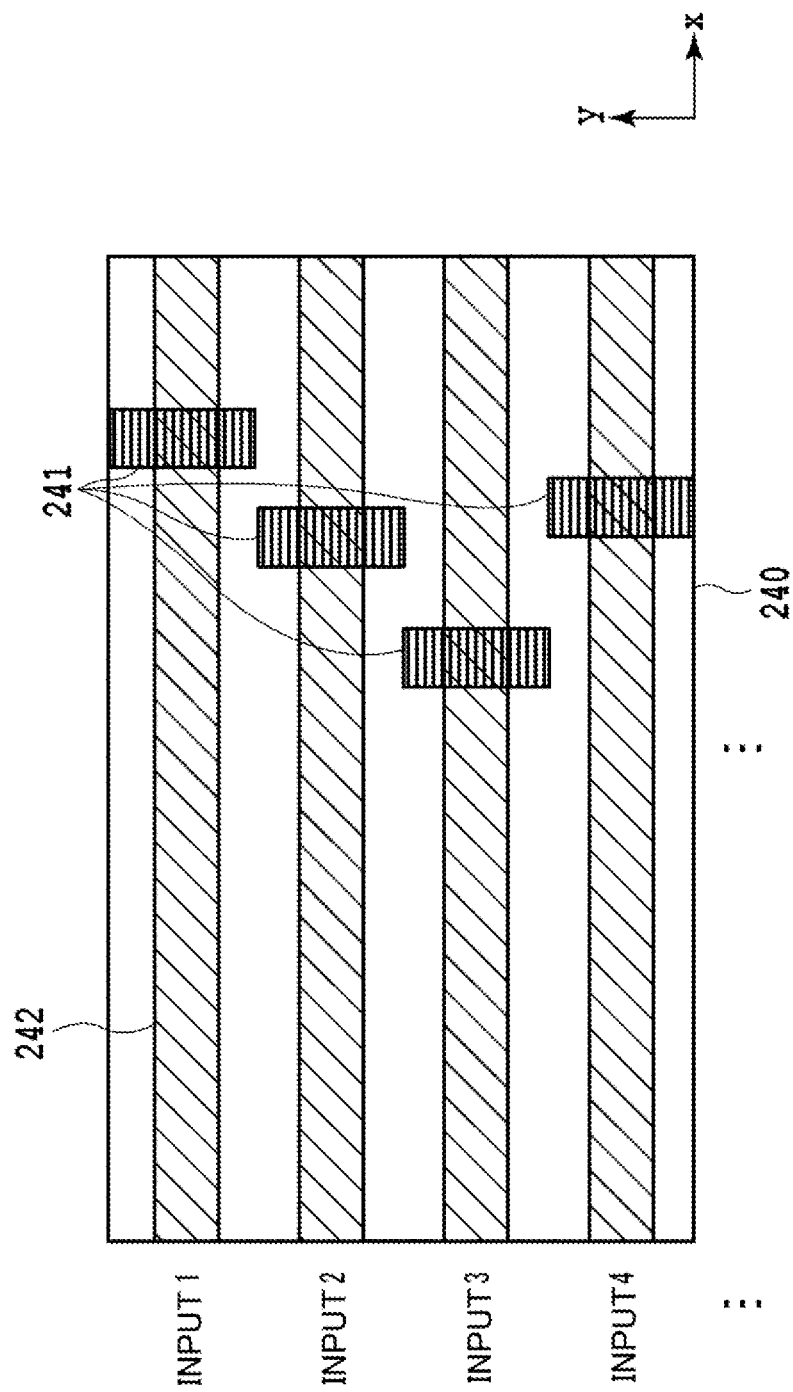
FIG. 6 is a diagram illustrating a phase pattern in the SLM to implement a bandpass filter operation using the optical spectral shaper according to the present invention.

FIG. 6 is a diagram illustrating a phase pattern in the SLM 240 to implement a band pass filter operation using the optical spectral shaper according to the present invention. To implement the band pass filter operation using the optical spectral shaper according to the present invention, the phase pattern illustrated in FIG. 6, for example, is set for the SLM 240. Here the connected sawtooth wave pattern 241 is configured such that the signal light is emitted at an angle to most easily couple with the output fibers $212_1$ to $212_N$, and the block phase pattern 242 is configured such that the signal light is emitted at an angle to not couple with the output fibers $212_1$ to 212 sufficiently. The center position of the connected sawtooth wave pattern 241 corresponds to the central wavelength of the band pass filter, and the width of the connected pattern in the x direction indicates the width of the band pass filter. As illustrated in FIG. 6, by displaying phase patterns that are different in the y axis, the signal of the wavelength channel, which is different for each input port, can be monitored.

Further, the band pass filter width can be changed by the phase pattern, hence the intensity of the optical signal, of which band width is different depending on the wavelength channel, such as the optical signals used for flex grid, can be monitored. Furthermore, by sweeping the central wavelength of the band pass filter in the in the time domain, the signal lights of all the wavelength channels can be monitored.

Figure 7:
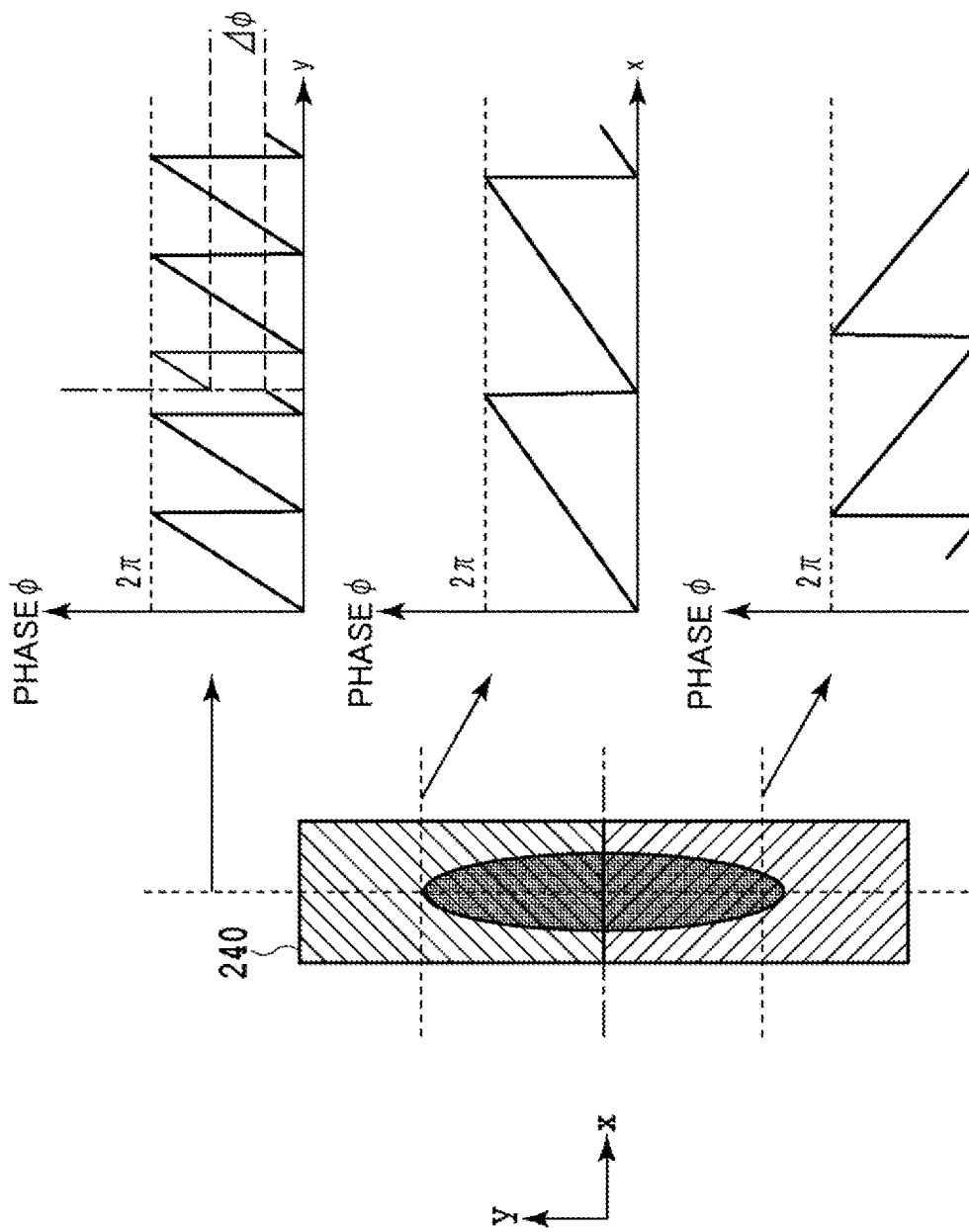
FIG. 7 is a diagram illustrating phase patterns in the SLM to implement a delay interference system using the optical spectral shaper according to the present invention.

FIG. 7 is a diagram illustrating the phase patterns in the SLM 240 to implement a delay interference system using the optical spectral shaper according to the present invention. To implement the delay interference system using the optical spectral shaper according to the present invention, the applied voltage is controlled so that two different phase patterns are set within a beam diameter of one signal light that entered the SLM 240, for example, as illustrated in FIG. 7. Thereby the light that entered the SLM 240 is branched into two paths.

In the y axis direction, however, slopes having the same inclination to couple with the optical fibers $212_1$ to $212_N$ sufficiently are set, and the phase offset amount $\Delta\varphi$ of the slope is different. Since the inclination of the phase is the same, the signals reach the output fibers at the same emission angle, but cause interference at the output ports since the phases are different by $\Delta\varphi$, and the intensity of the signal light, to couple with the optical fiber, changes in accordance with $\Delta\varphi$. In the x axis direction, phase slopes are set in mutually opposite directions. Since the optical path difference $\Delta_\tau$ is generated by the phase slope in the x axis, the interference at the output ports becomes similar to the delay interference. The optical path length $\Delta_\tau$ can be changed by changing the inclination of the slope in the x axis direction (e.g. see NPL 2).

According to the optical spectral shaper of Embodiment 1 of the present invention, the optical signals can enter the SLM at high density, hence even if a number of input/output ports increases, a compact optical spectral shaper can be implemented.

Embodiment 2

Figure 8:
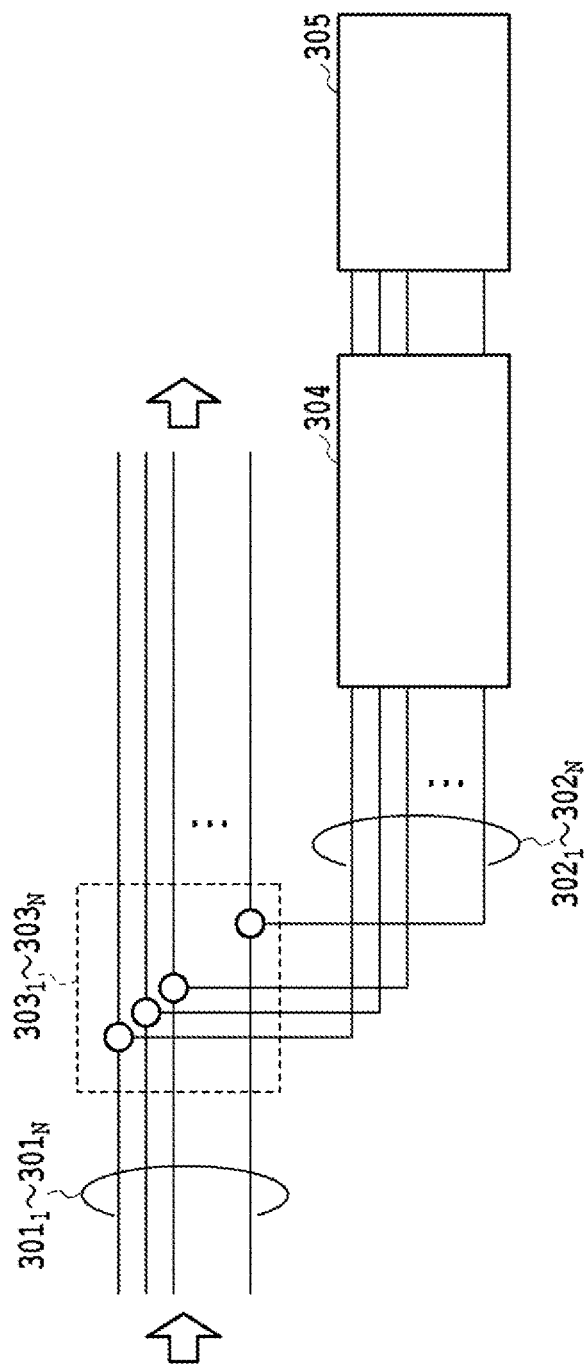
FIG. 8 is a schematic diagram illustrating a configuration of an optical signal monitoring apparatus according to Embodiment 2 of the present invention.

FIG. 8 is a schematic diagram illustrating a configuration of an optical signal monitoring apparatus according to Embodiment 2 of the optical spectral shaper of the present invention. The optical signal monitoring apparatus illustrated in FIG. 8 includes: N-array optical couplers $303_1$ to $303_N$ which branch a part of the signal lights in the N number of main optical fibers $301_1$ to $301_N$, to which N number of monitoring target signal lights are inputted, into N number of connection fibers $302_1$ to $302_N$; an N-array optical spectral shaper 304 which can independently control the optical signals branched by the optical couplers $303_1$ to $303_N$ respectively, and a receiving unit array 305 that can independently measure the light intensity of N number of output signals from the optical spectral shaper 304.

For the optical couplers $303_1$ to $303_N$, a 1×2 optical coupler having one input and two outputs, for example, can be used. For the optical couplers $303_1$ to $303_N$, an optical fiber type coupler or a coupler of the interference system of the optical waveguide, for example, can be used.

The N-array optical spectral shaper 304 is configured such that the optical monitoring functions, such as an arbitrary wavelength filtering and delay interference, can be dynamically changed for N number of input lights. For the optical spectral shaper 304, the optical spectral shaper of Embodiment 1, for example, can be used. According to the optical monitoring apparatus of Embodiment 2 of the present invention, a large value, such as 231, can be set for the number N, as mentioned above.

For the light-receiving unit array 305, an optical fiber array, where many PDs are integrated on a substrate or where PDs are mounted at a tip, may be used, or a surface photodetector, such as a CCD and InGaAs camera, may be used. To the light-receiving unit array 305, a calculation unit (not illustrated) is connected, and this calculation unit calculates the measurement values in accordance with such monitor content as the intensity of the signal light and the OSNR at each main optical fiber $301_1$ to $301_N$, based on the intensity of light measured by the light-receiving unit array 305.

An operation of the optical signal monitoring apparatus as a multi-channel OCM, according to Embodiment 2 of the present invention, will be described. Each signal light tapped from the main optical fibers $301_1$ to $301_N$ by the optical couplers $303_1$ to $303_N$ is inputted to each input port of the optical spectral shaper 304 respectively. In the optical spectral shaper 304, a central frequency of the wavelength channel to be measured, and a band pass filter having a transmission wavelength band are set for each wavelength channel. This means that the signal light outputted from the optical spectral shaper 304 includes only the components of a desired wavelength channel. Therefore if n=1, 2, . . . , N, then the intensity $P_n$ [dB] of the signal light propagating through each main optical fiber 301 can be converted from the received light intensity $P_{PD-n}$ [dB] detected by the light-receiving unit array 305 respectively, and the value $\alpha_n$ [dB] of the optical loss that is generated in the optical system after being tapped by each optical coupler $303_1$ to $303_N$, using the following (Expression 8).

Formula 8

$$P_n = \beta(P_{PD-n} + \alpha_n)$$ (Expression 8)

Here β is a branching ratio of the output to the connection fiber with respect to the output to the main optical fiber in each optical coupler $303_1$ to $303_N$. The values of β and $\alpha_n$ can be determined by actual experiment, by light propagation simulation or the like, and stored in advance. Hence by monitoring $P_{PD-n}$, the value of the intensity $P_n$ of the signal light propagating through the optical channel of each main optical fiber $301_1$ to $301_N$ can be specified.

Each signal light outputted from the optical spectral shaper 304 is inputted to the light-receiving unit array 305. In the case of the optical spectral shaper 304, an arbitrary shape of the filter can be set for each wavelength channel, hence the intensity of the signal light of the wavelength channel, that is different for each main optical fiber $301_1$ to $301_N$, can be measured by the light-receiving unit array 305. Further, in the case of the optical spectral shaper 304, the band pass filter can be dynamically reconfigured, therefore the light intensity of the signal light can be measured for all the wavelength channels of each main optical fiber $301_1$ to $301_N$ by sweeping the central wavelengths in the time domain.

An operation of the optical signal monitoring apparatus according to Embodiment 2 of the present invention, which functions as a multi-channel OSNR monitor, will be described next. In the case where the optical signal monitoring apparatus according to Embodiment 2 of the present invention operates as a multi-channel OSNR monitor, in addition to implementing the above mentioned functions, the optical spectral shaper 304 is configured such that the delay interference system is formed by branching the signal light in a same band into two and coupling the branched lights with a single light-receiving unit in the light-receiving unit array 305. As a result, in the light-receiving unit array 305, the interference light intensity, after the signal light propagating a desired wavelength channel causing delay interference, can be measured.

If the phase of one side of the signal light in the delay interference system is swept and the value $P_{max}$ by which the interference light intensity becomes the maximum and the value $P_{min}$ by which the interference light intensity becomes the minimum are calculated, then OSNR [dB] can be calculated based on the intensity ratio $R = P_{max}/P_{min}$ using the following (Expression 9) (e.g. see NPL 1).

$$OSNR[\text{dB}] = 10\log_{10}\frac{(s+1)(R-n)}{(n+1)(s-R)}\frac{NEB}{12.5[\text{GHz}]}[\text{dB}] \quad \text{Formula 9}$$

(Expression 9)

In the above (Expression 9), s and n are the values of R in the case where the optical noise does not exist and in the case where the signal light does not exist respectively, and NEB is the effective transmission band of the noise components, that is, the band of the band pass filter. s and n can be calculated in advance by calibration, and NEB can be calculated by the width of the transmission band that is set in the SLM. This means that OSNR can be estimated by monitoring the above mentioned R.

As described above, in the case of the optical spectral shaper 304, the band pass filter can be dynamically reconfigured, hence the OSNR of the signal light can be measured for all the wavelength channels of each main optical fiber $301_1$ to $301_N$ by sweeping the central wavelength in the time domain. In addition, a different monitoring function can be assigned for each main optical fiber $301_1$ to $301_N$ and each wavelength channel.

Embodiment 3

Figure 9:
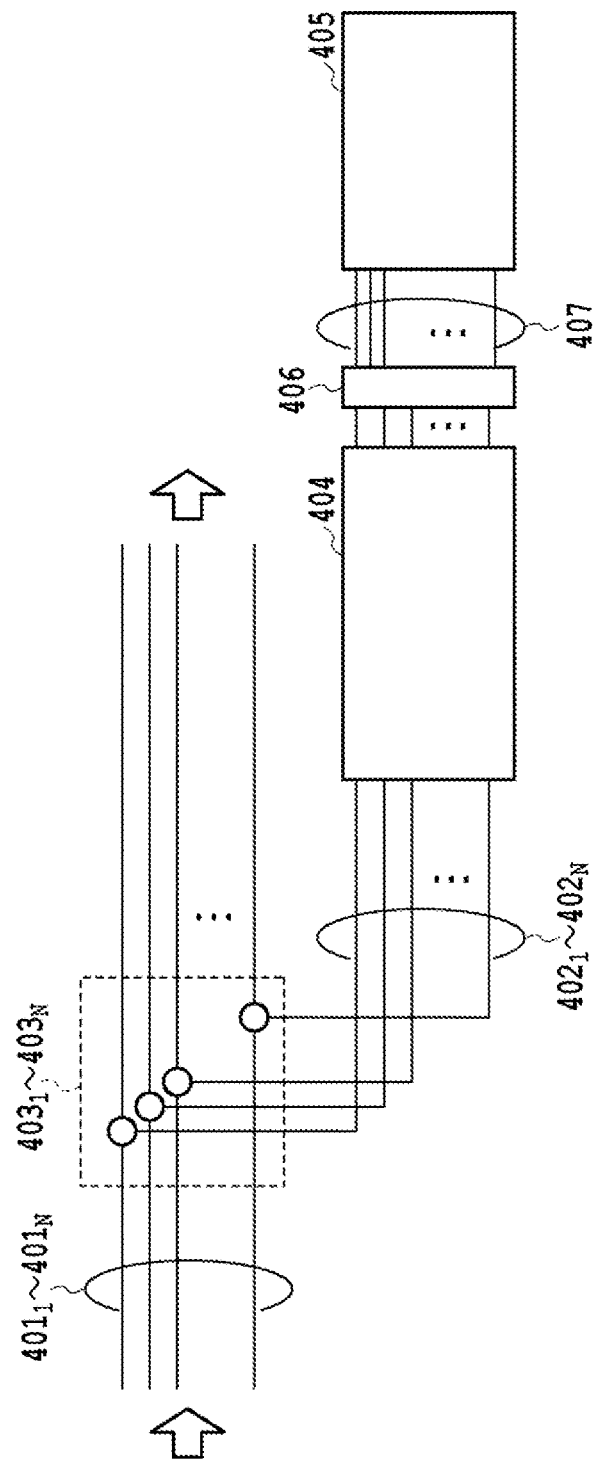
FIG. 9 is a schematic diagram illustrating a configuration of an optical signal monitoring apparatus according to Embodiment 3 of the present invention.

FIG. 9 is a schematic diagram illustrating a configuration of an optical signal monitoring apparatus according to Embodiment 3 of the present invention. The optical signal monitoring apparatus illustrated in FIG. 9 includes: N number of main SDM optical fibers $401_1$ to $401_N$ of which spatial multiplex number of the spatial multiplexing is K; n number of connection SDM fibers $402_1$ to $402_N$; N-array SDM optical couplers $403_1$ to $403_N$ which branch a part of the signal lights in the N number of main SDM optical fibers $401_1$ to $401_N$ into N number of connection SDM fibers $402_1$ to $402_N$; an N-array SDM optical spectral shaper 404 which can independently control the signal lights branched by the SDM optical couplers $403_1$ to $403_N$ respectively; a fan-in/fan-out (FIFO) unit 406 that separates the signal lights outputted from the SDM optical spectral shaper 404 to the single mode fibers (SMF) 407; a light-receiving unit array 405 that can independently measure the light intensity of the (N×K) number of signal lights which were fanned out by the FIFO unit 406; and (N×K) number of SMFs 407 that connect the FIFO unit 406 and the light-receiving unit array 405.

For each main SDM optical fiber $401_1$ to $401_N$ and connection SDM fiber $402_1$ to $402_N$, a multi-core fiber or a multi-mode fiber can be used.

Each SDM optical coupler $403_1$ to $403_N$ branches the spatial-multiplexed signal light in each main SDM optical fiber $401_1$ to $401_N$ to each main SDM optical fiber $401_1$ to $401_N$, and to each connection SDM fiber $402_1$ to $402_N$ respectively. For each SDM optical coupler $403_1$ to $403_N$, an optical fiber type coupler, or a coupler of the interference system of the optical waveguide, can be used, for example.

The N-array SDM optical spectral shaper 404 has a function to perform arbitrary wavelength filtering or delay interference on the N number of spatially multiplexed signal lights (spatial multiplex number is K), and output the signal lights. For the SDM optical spectral shaper 404, the optical spectral shaper of Embodiment 1, for example, can be used.

For the light-receiving unit array 405, an optical fiber array where many PDs are integrated on a substrate or where PDs are mounted at a tip, may be used, or a surface photodetector, such as a CCD and InGaAs camera, may be used.

The FIFO unit 406 can perform SMF conversion on the spatially multiplexed optical signals. For example, the FIFO unit 406 can be constructed by a photonic lantern, a fiber bundle, an optical waveguide or the like.

In the optical signal monitoring apparatus according to Embodiment 3 of the present invention, the signal light tapped from each of the N number of main SDM optical fibers $401_1$ to $401_N$ is inputted to each input port of the optical spectral shaper 404. The optical spectral shaper 404 shapes the spectral shape of each of the N number of spatially multiplexed signal lights (spatial multiplex number is K) to have a desired shape, and outputs the shaped signal light to the FIFO unit 406.

The N number of spatially multiplexed signal lights (spatial multiplex number is K) inputted from the optical spectral shaper 404 to the FIFO unit 406 are separated into (N×K) number of signal lights by the FIFO unit 406, and outputted to the light-receiving unit array 405 via the (N×K) number of SMFs 407.

In the optical signal monitoring apparatus according to Embodiment 3 of the present invention, the OCM operation and the OSNR operation are performed only when a number of inputs/outputs changed from N to (N×K), and are implemented by the same method as the method described in Embodiment 2.

An advantage of the optical signal monitoring apparatus according to Embodiment 3 over the optical signal monitoring apparatus according to Embodiment 2 is that the SDM transmitted signal light can be handled as well.

Figure 10:
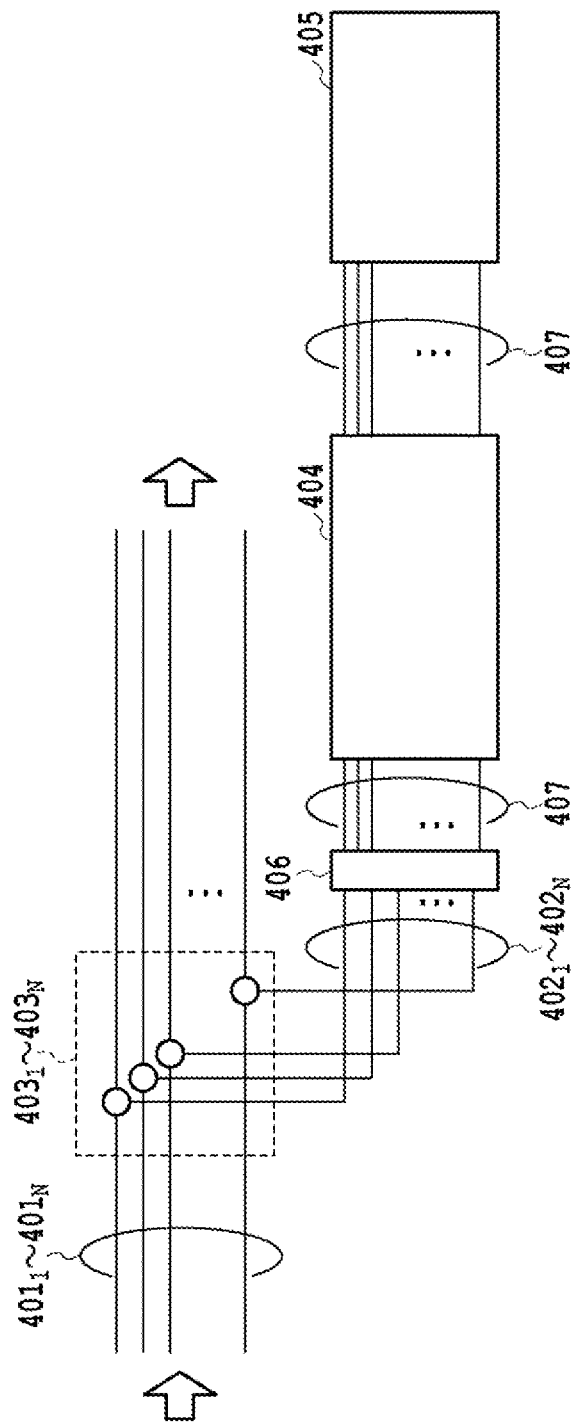
FIG. 10 is a schematic diagram illustrating another configuration of the optical signal monitoring apparatus according to Embodiment 3 of the present invention.

FIG. 10 indicates another example of the optical signal monitoring apparatus according to Embodiment 3 of the present invention. In the optical signal monitoring apparatus illustrated in FIG. 10, the FIFO unit 406 is disposed, not in a subsequent stage, but in the previous stage of the SDM optical spectral shaper 404, and the FIFO unit 406 and the SDM optical spectral shaper 404, and the SDM optical spectral shaper 404 and the light-receiving unit array 405 are connected via (N×K) number of SMFs 407 respectively.

Figure 11:
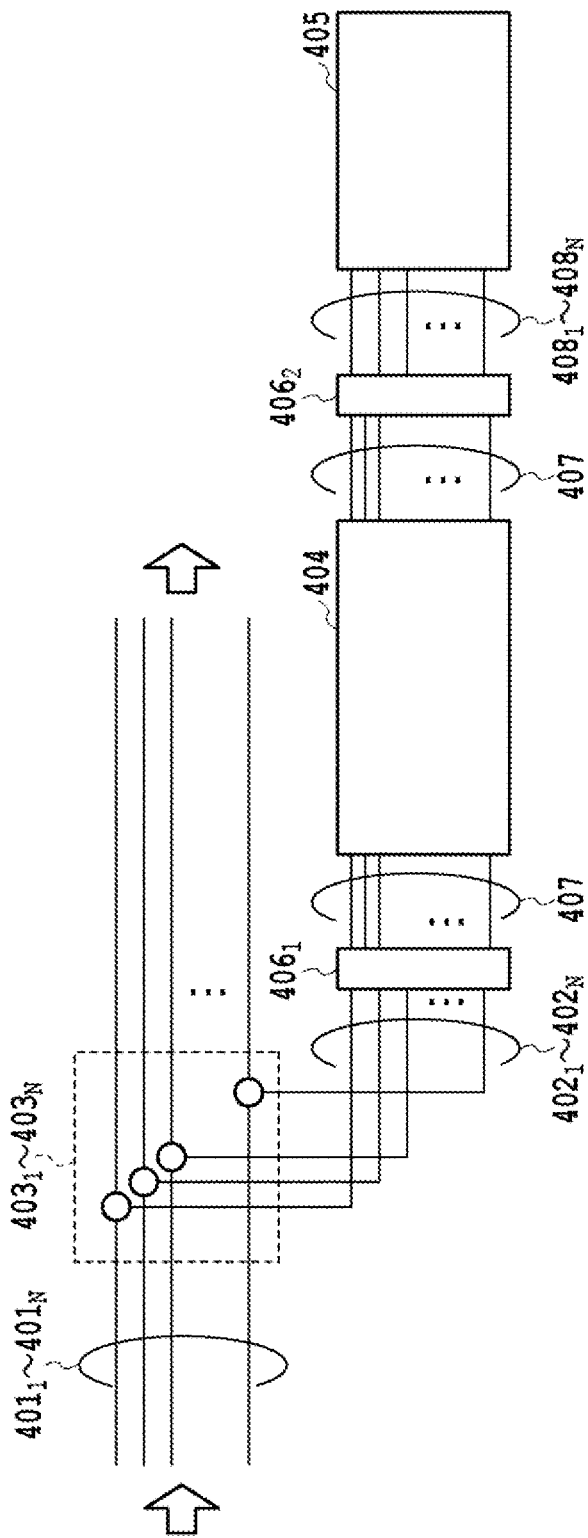
FIG. 11 is a schematic diagram illustrating still another configuration of the optical signal monitoring apparatus according to Embodiment 3 of the present invention.

FIG. 11 indicates still another example of the optical signal monitoring apparatus according to Embodiment 3 of the present invention. In the optical signal monitoring apparatus illustrated in FIG. 11, the FIFO unit $406_1$ and $406_2$ are disposed in both the previous stage and subsequent stage of the SDM optical spectral shaper 404. The SDM optical spectral shaper 404 is connected with the FIFO unit $406_1$ and with the FIFO unit $406_2$ respectively via (N×K) number of SMFs 407. The FIFO unit $406_2$ and the light-receiving unit array 405 are connected by N number of output SDM optical fibers $408_1$ to $408_N$ (spatial multiplex number is K).

An appropriate configuration may be selected from the configurations illustrated in FIG. 9 to FIG. 11, in accordance with a desired number of input/output ports, the spatial multiplex number, cost, size and the like.

Embodiment 4

An optical signal monitoring apparatus according to Embodiment 4 of the present invention will be described with reference to FIG. 12 and FIG. 13. In the case of the above mentioned optical signal monitoring apparatuses according to Embodiments 2 and 3, the light-receiving unit array is required outside the optical spectral shaper. In Embodiment 4, the light-receiving unit array is not required since the OSNR monitoring function is not included.

FIG. 12 is a diagram illustrating a configuration of an optical signal monitoring unit used for an optical signal monitoring apparatus according to Embodiment 4 of the present invention. The optical signal monitoring unit illustrated in FIG. 12 includes: a plurality of input fibers 5111 to 511N which are input ports; a plurality of output fibers 5121 to 512N which are output ports; an optical waveguide front end 520; an optical element group 530; and an image sensor 540.

Figure 12A:
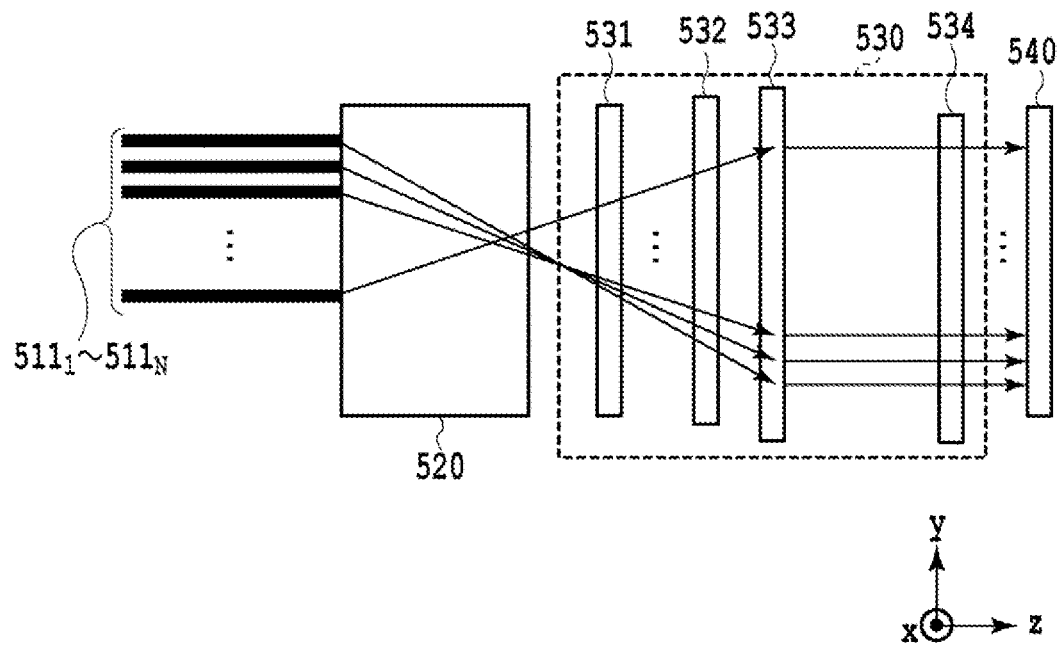
FIG. 12 is a schematic diagram illustrating an optical spectral shaper according to Embodiment 4 of the present invention.
Figure 12B:
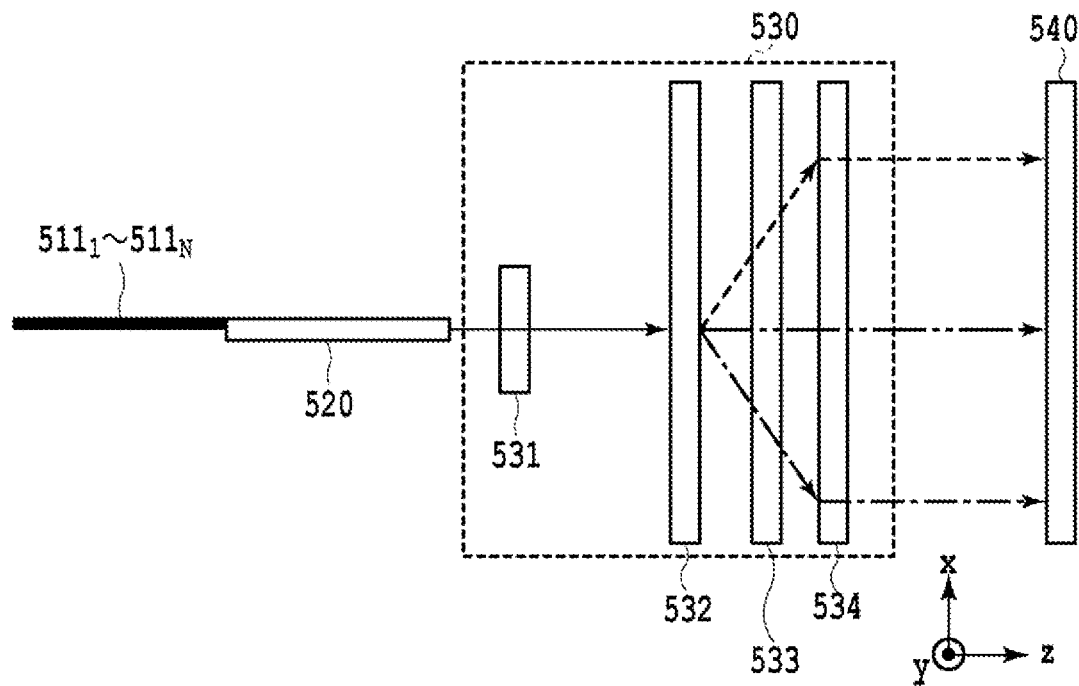

FIG. 12(a) is a diagram viewed from the x axis direction, and FIG. 12(b) is a diagram viewed from the y axis direction. In FIG. 12(a) and FIG. 12(b), the direction in which the input fibers 511 and output fibers 512 are arrayed is the y axis, the direction in which the signal light propagates through the input fibers 511 is the z axis, and the direction vertical to the y axis and z axis is the x axis. The optical waveguide front end 520 and the optical element group 530 are the same as those described in Embodiment 1.

A characteristic of Embodiment 4 is that the image sensor 540 is disposed instead of the SLM. The image sensor 540 is an element where a plurality of pixels are disposed on the xy plane in a matrix, and the output response thereof changes in accordance with the intensity of light inputted to each pixel. For the image sensor 540, a CCD camera or an InGaAs camera, for example, can be used. In the image sensor 540, light is irradiated to a different position of the image sensor 540 for each input port and wavelength, hence by detecting the positional relationships of the input ports and the image sensor, the optical power can be measured for each input port and for each wavelength. This means that the optical signal monitoring apparatus constituted of the optical signal monitoring unit according to Embodiment 4 can have the function of the OCM without disposing the light-emitting unit array outside the apparatus, which has a superb effect.

Figure 13:
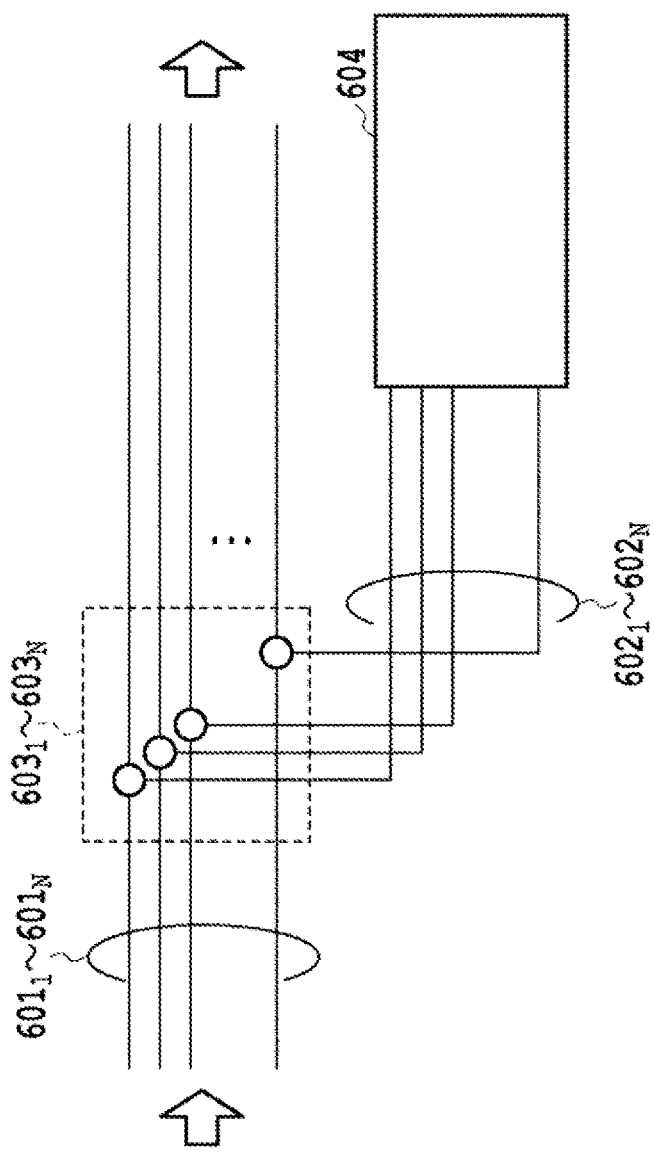
FIG. 13 is a schematic diagram illustrating an optical signal monitoring apparatus according to Embodiment 4 of the present invention.

FIG. 13 is a diagram illustrating the optical signal monitoring apparatus according to Embodiment 4 of the present invention. The optical signal monitoring apparatus illustrated in FIG. 13 includes: N-array optical couplers $603_1$ to $303_N$ that branch a part of the signal lights in the N number of main optical fibers $601_1$ to $601_N$ to which N number of monitoring target signal lights are inputted, into N number of connection fibers $602_1$ to $602_N$; and an N-array optical signal monitoring unit 604 that independently controls the optical signals, which were branched by the optical couplers $603_1$ to $603_N$ respectively, and independently measures the intensity of each light.

For each main optical fiber 601 and connection fiber 602, the optical fiber used in Embodiment 2, or the SDM optical fiber used in Embodiment 3, can be used.

For the optical signal monitoring unit 604, the optical signal monitoring unit illustrated in FIG. 12 can be used. A calculation unit (not illustrated) is connected to the optical signal monitoring unit 604, and this calculation unit calculates the intensity of the signal light in each main optical fiber $601_1$ to $601_N$ based on the intensity of light measured by the optical signal monitoring unit 604.

By using the arrangement illustrated in FIG. 13, an optical signal monitoring apparatus that can perform OCM of the fiber array and spatial multiplexing fiber array can be implemented without disposing the light-receiving unit array.

In Embodiment 4 as well, the maximum spatial multiplex number N is determined by the above mentioned (Expression 1) to (Expression 8), and can be set to 231, for example.

In the description of the above embodiments, the optical system, to satisfy the above mentioned functions, is implemented using the minimum components, but there are other countless optical systems that can implement similar functions. For example, a reflecting mirror may be installed to decrease the optical path length, or a lens group, to correct aberrations, may be added. Furthermore, in the above embodiments, the signal light separated by the optical coupler was separated using the FIFO unit, but the optical signal may be separated into each spatial channel using the FIFO unit, and each of the separated lights may be branched by the optical coupler that is used for normal SMF transmission.

The invention claimed is:

1. An optical spectral shaper, comprising:
a plurality of input fibers that input signal lights;
a plurality of output fibers that output the signal lights;
an optical waveguide front end that includes an input side waveguide portion which emits each signal light at a different angle while expanding a beam diameter of the signal light emitted from each of the plurality of input fibers respectively, and an output side waveguide portion that wave-guides each of the inputted signal lights and couples the signal lights with the plurality of output fibers respectively;
a spatial light modulator that includes a plurality of pixels which are arrayed on a plane in a matrix and a drive unit that drives the plurality of pixels, and that changes the phase of each inputted signal light by the drive unit controlling the phase patterns of the plurality of pixels, and emits the signal light, and the spatial light modulator in which a specific phase pattern is set for each pixel region to which each signal light enters; and
an optical element group that is disposed so that each of the signal lights emitted from the input side waveguide portion of the optical waveguide front end is collected at a different pixel position on the spatial light modulator, and the optical element group that is disposed so as to couple the light emitted from the spatial light modulator with the output side waveguide portion of the optical waveguide front end.

2. The optical spectral shaper according to claim 1, wherein the input side waveguide portion of the optical waveguide front end includes:
a plurality of input waveguide portions that wave-guide each signal light inputted from the plurality of input fibers;
an input side slab waveguide that disperses and guides each signal light inputted from each of the plurality of first input waveguide portions while expanding the optical bean diameter of the signal light;
a plurality of second input waveguide portions to which the signal lights dispersed by the input side slab waveguide enter respectively; and
an optical phased array exit portion that converts the emission angle in accordance with the wave front of the signal light emitted from each of the plurality of second input waveguide portions, and outputs the converted signal light to the optical element group, the output side waveguide portion of the optical waveguide front end includes:
an optical phased array entrance portion that inputs a signal light which is outputted from the spatial light modulator via the optical element group;
a plurality of first output waveguide portions that propagate each signal light which enters the optical phased array entrance portion respectively;
an output slab waveguide that wave-guides the signal light which is inputted from each of the plurality of first optical waveguide portions; and
a second output waveguide portion that wave-guides each signal light inputted from the output slab waveguide, and outputs each signal light to the plurality of optical fibers respectively.

3. The optical spectral shaper according to claim 2, wherein the optical element group includes at least:
a diffraction grating that disperses the wavelength of the entered signal light; and
a Fourier lens that collects the signal light of which wavelength was dispersed by the diffracting grating to a different pixel position on the spatial light modulator.

4. An optical signal monitoring apparatus, comprising:
the optical spectral shaper according to claim 2;
an optical coupler that branches optical signals of a plurality of main optical fibers and inputs the branched optical signals to the plurality of input fibers;
a light receiving unit array that measures the intensity of a plurality of signal lights outputted from the optical spectral shaper; and
a calculation unit that calculates a measurement value in accordance with the monitor content for each of the signal lights based on the intensity of each light measured by the light receiving unit array respectively.

5. The optical spectral shaper according to claim 1, wherein the optical element group includes at least:
a diffraction grating that disperses the wavelength of the entered signal light; and
a Fourier lens that collects the signal light of which wavelength was dispersed by the diffracting grating to a different pixel position on the spatial light modulator.

6. An optical signal monitoring apparatus, comprising:
the optical spectral shaper according to claim 5;
an optical coupler that branches optical signals of a plurality of main optical fibers and inputs the branched optical signals to the plurality of input fibers;
a light receiving unit array that measures the intensity of a plurality of signal lights outputted from the optical spectral shaper; and
a calculation unit that calculates a measurement value in accordance with the monitor content for each of the signal lights based on the intensity of each light measured by the light receiving unit array respectively.

7. An optical signal monitoring apparatus, comprising:
the optical spectral shaper according to any one claim 1;
an optical coupler that branches optical signals of a plurality of main optical fibers and inputs the branched optical signals to the plurality of input fibers;
a light receiving unit array that measures the intensity of a plurality of signal lights outputted from the optical spectral shaper; and
a calculation unit that calculates a measurement value in accordance with the monitor content for each of the signal lights based on the intensity of each light measured by the light receiving unit array respectively.

8. The optical signal monitoring apparatus according to claim 7, wherein the calculation unit calculates the intensity of a signal light propagating through each of the plurality of input fibers, based on the intensity of the plurality of signal lights measured by the light-receiving unit array and a value of optical loss that is generated in the optical system when the signal light couples with the light-receiving unit array.

9. The optical signal monitoring apparatus according to claim 8, wherein the plurality of main optical fibers are optical fibers compatible with the SDM that propagates a spatially multiplexed signal light, and the optical signal monitoring apparatus further includes a fan-in/fan-out unit that converts the spatially multiplexed signal light into signal mode fiber.

10. The optical signal monitoring apparatus according to claim 7, wherein the spatial light modulator is configured such that the emitted signal light is branched into two, and forms a delay interferometer by coupling the optical signal branched into two with a single light-receiving unit in the light-receiving unit array, the light-receiving array measures the light intensity of the light after the optical signals branched into two cause delay interference, and the calculation unit calculates OSNR from the ratio of the maximum value and the minimum value of the light intensity of the light after delay interference was caused.

11. The optical signal monitoring apparatus according to claim 10, wherein the plurality of main optical fibers are optical fibers compatible with the SDM that propagates a spatially multiplexed signal light, and the optical signal monitoring apparatus further includes a fan-in/fan-out unit that converts the spatially multiplexed signal light into signal mode fiber.

12. The optical signal monitoring apparatus according to claim 7, wherein the plurality of main optical fibers are optical fibers compatible with the SDM that propagates a spatially multiplexed signal light, and the optical signal monitoring apparatus further includes a fan-in/fan-out unit that converts the spatially multiplexed signal light into signal mode fiber.

13. An optical signal monitoring apparatus comprising:
a plurality of input fibers that input signal lights;
a plurality of output fibers that output the signal lights;
an optical waveguide front end that includes an input side waveguide portion which emits each signal light at a different angle while expanding a beam diameter of the signal light emitted from each of the plurality of input fibers respectively;
an image sensor constituted of a plurality of pixels that are arrayed on a plane in a matrix;
an optical element group that is disposed so that each of the signal lights emitted from the input side waveguide portion of the optical waveguide front end is collected at a different pixel position on the image sensor respectively; and
a calculation unit that calculates an intensity of the signal light propagating through each of the plurality of input fibers, based on the intensity of the light measured by the image sensor respectively.

* * * * *